United States Patent
Weidner et al.

(10) Patent No.: US 10,041,389 B2
(45) Date of Patent: Aug. 7, 2018

(54) VALVE HOUSING AND VALVE

(71) Applicant: TENNECO GMBH, Edenkoben (DE)

(72) Inventors: Michael Weidner, Edenkoben (DE);
Andreas Steigert, Lambrecht (DE);
Daniel König,
Eggenstein-Leopoldshafen (DE)

(73) Assignee: TENNECO GMBH, Edenkoben (DE)

( * ) Notice: Subject to any disclaimer, the term of this patent is extended or adjusted under 35 U.S.C. 154(b) by 0 days.

(21) Appl. No.: 15/322,475

(22) PCT Filed: Jul. 21, 2015

(86) PCT No.: PCT/EP2015/066674
§ 371 (c)(1),
(2) Date: Dec. 28, 2016

(87) PCT Pub. No.: WO2016/016052
PCT Pub. Date: Feb. 4, 2016

(65) Prior Publication Data
US 2017/0191391 A1 Jul. 6, 2017

(30) Foreign Application Priority Data

Jul. 28, 2014 (DE) .................. 10 2014 110 616

(51) Int. Cl.
*F01N 3/02* (2006.01)
*F01N 3/04* (2006.01)
(Continued)

(52) U.S. Cl.
CPC ........... *F01N 3/0205* (2013.01); *F01N 3/043* (2013.01); *F16K 11/052* (2013.01);
(Continued)

(58) Field of Classification Search
CPC ...... F01N 3/0205; F01N 3/043; F16K 11/052; F16K 27/0218; F28F 27/02
See application file for complete search history.

(56) References Cited

U.S. PATENT DOCUMENTS 5,908,047 A * 6/1999 Nakamura .............. F01N 3/027
137/625.44
7,438,062 B2 10/2008 Okawa et al.
(Continued)

FOREIGN PATENT DOCUMENTS

DE 10149381 A1 5/2003
DE 10301395 A1 7/2004
(Continued)

OTHER PUBLICATIONS

German Search Report dated Dec. 5, 2017.

*Primary Examiner* — Craig Schneider
*Assistant Examiner* — Kevin Barss
(74) *Attorney, Agent, or Firm* — Hudak, Shunk & Farine Co. LPA

(57) ABSTRACT

A housing for fluidically connecting an exhaust gas line to an exhaust gas heat exchanger, wherein the main flow channel of the housing extends in the direction of a central axis (X), from an inlet opening to an outlet opening, with an average flow cross section (SQ). In the main flow channel, at least one opening is provided in the housing for a valve shaft, and on the housing, at least one bypass opening formed by a connecting piece is provided between the inlet opening and the outlet opening. The housing is formed by a maximum of two deep-drawn sub-shells made of sheet metal, wherein the connecting piece is formed circumferentially around the bypass axis (Y) for connecting an exhaust gas heat exchanger via the upper shell and/or via the lower shell.

16 Claims, 3 Drawing Sheets

(51) Int. Cl.
*F16K 11/052* (2006.01)
*F16K 27/02* (2006.01)
*F28F 27/02* (2006.01)

(52) U.S. Cl.
CPC .......... *F16K 27/0218* (2013.01); *F28F 27/02* (2013.01); *F01N 2240/02* (2013.01); *F01N 2410/00* (2013.01); *F28F 2250/06* (2013.01)

(56) References Cited

U.S. PATENT DOCUMENTS

| | | |
|---|---|---|
| 2013/0061584 A1 | 3/2013 | Gerges et al. |
| 2014/0144127 A1 | 5/2014 | Diehl et al. |

FOREIGN PATENT DOCUMENTS

| | | |
|---|---|---|
| DE | 102004045021 A1 | 4/2006 |
| DE | 10 2012 107 840 A1 | 2/2014 |
| EP | 1 355 058 A2 | 10/2003 |
| EP | 1541253 A1 | 11/2004 |
| FR | 502 117 A | 5/1920 |
| FR | 2 989 998 A1 | 11/2013 |

* cited by examiner

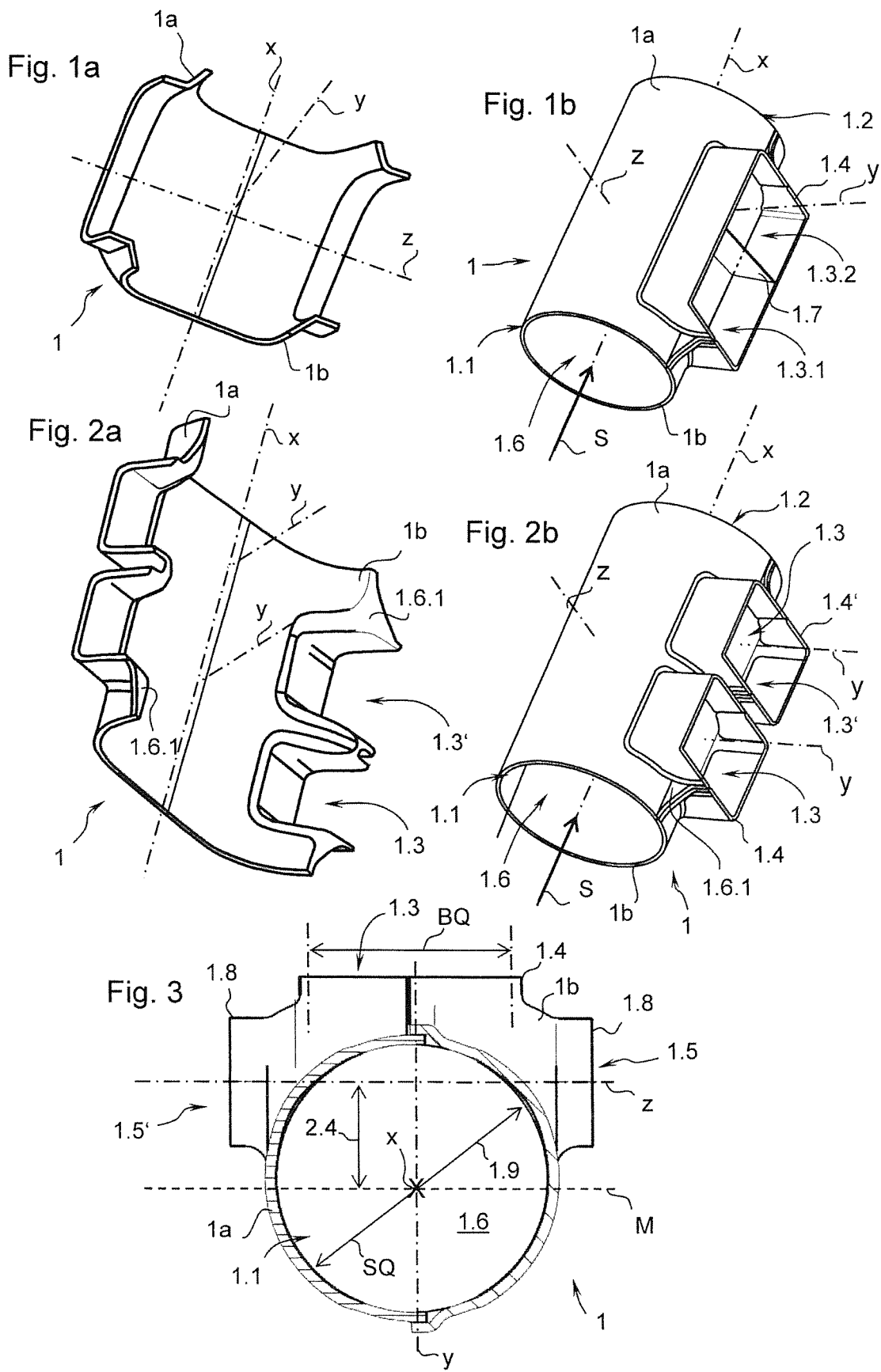

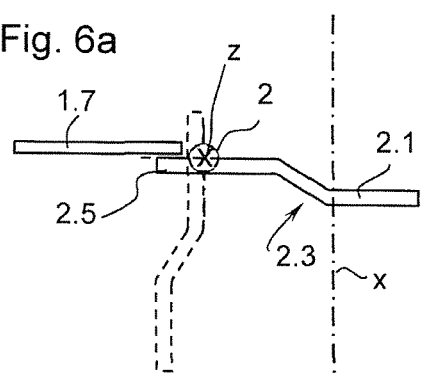
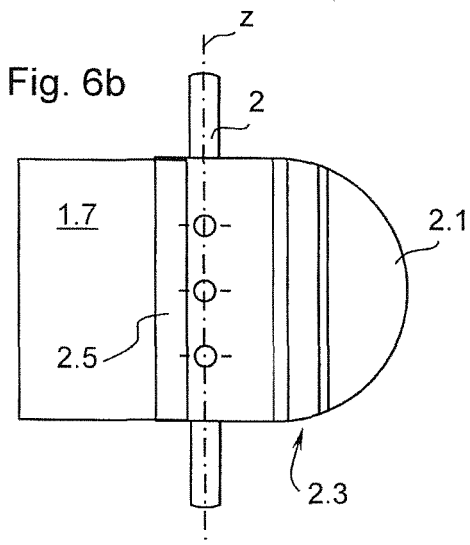
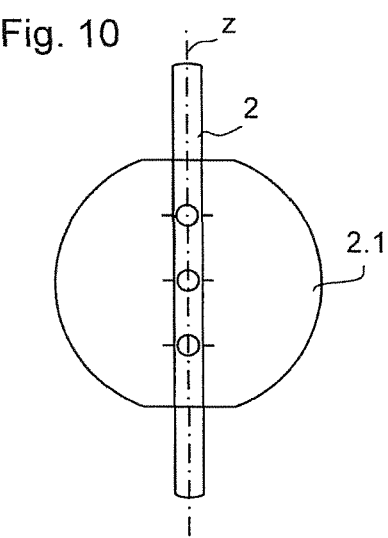
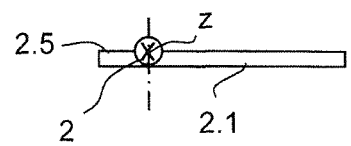
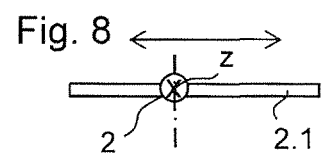
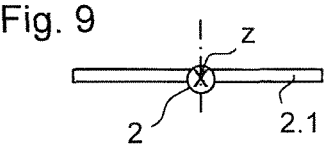
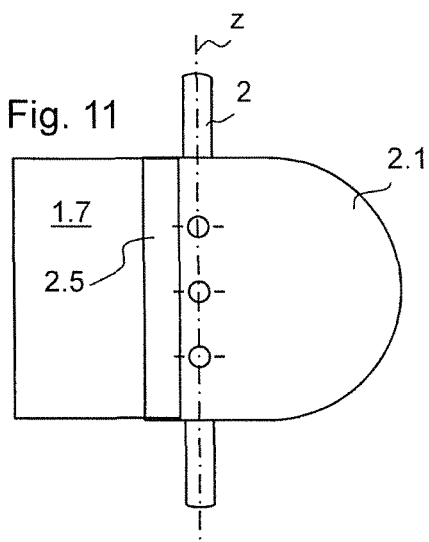

VALVE HOUSING AND VALVE

FIELD OF THE INVENTION

The invention relates to a housing for fluidically connecting an exhaust gas line to an exhaust gas heat exchanger, wherein the main flow channel of the housing extends in the direction of a central axis, from an inlet opening to an outlet opening, with an average flow cross section. In the main flow channel, at least one opening is provided in the housing for a valve shaft. In the housing, there is provided between the inlet opening and the outlet opening at least one bypass opening formed by a connecting piece with an average bypass cross section in the direction of a bypass axis for connecting an exhaust gas heat exchanger. The housing is formed by a maximum of two deep-drawn sub-shells made of sheet metal, executed as an upper shell and a lower shell, which respectively form one of two parts of the main flow channel which complement one another to form a whole, said main flow channel extending in the main direction of flow from the inlet opening to the outlet opening.

BACKGROUND OF THE INVENTION

U.S. Pat. No. 7,438,062 B2 and FR 502 117 A describe cast iron housings for connecting to a heat exchanger in which a valve flap for controlling the exhaust gas is arranged. The housings comprise a flange b01y means of which the housing is screwed to a heat exchanger housing. The shaft for the valve flap is supported in a bore of the housing.

DE 10 2012 107 840 A1 describes a device for sealing a flow channel with a flap, a flap edge and a sealing contour. The sealing contour for the flap is formed by a transformed region of the wall of the flow channel. The housing is manufactured from two hinged shells. Each hinged shell is connected to two ports, allowing the fluid to enter and exit.

According to FR 2 989 998 A1, a housing for a valve, which is manufactured from two sub-shells and a central frame, is known, in which the entire connecting piece for the bypass opening in a shell is manufactured as a passage.

SUMMARY OF THE INVENTION

The object of the invention is to configure and arrange a housing having a valve shaft supported precisely in a bore in such a manner that the housing geometry can be designed more flexibly and the housing and the valve can, at the same time, be manufactured more easily.

The object is achieved in accordance with the invention in that the two sub-shells, made up of a one-piece, deep-drawn sheet metal part, form a single-piece housing and/or the connecting piece, partially made up of the upper shell and partially of the lower shell, complementarily form(s) an entire circumferential connecting piece around the bypass axis.

The advantage of a one-piece, deep-drawn sheet metal part is that the housing is simpler to manufacture, reducing the amount of starting material wasted, particularly for different housing geometries. During deep-drawing of the single-piece housing the sheet metal component is wound or folded following the deep-drawing process, in order to join the two sub-shells. Thanks to this method of dividing the housing in a plane of the bypass axis, one half-connecting piece respectively can be manufactured during the deep-drawing of the shell. During the deep-drawing of the individual sub-shells the connecting piece can attain relatively large dimensions depending on the application because, in contrast to a passage in a shell, it can not only be made up by the material of the pipe. The size and the shape of the blank, which is deep-drawn, determine the size of the connecting piece. Providing the connecting pieces in each case in halves on the sub-shells thus makes it possible to vary the length of the connecting pieces at will. If the starting material or the blank is of sufficient dimensions, connecting pieces ranging in lengths from a few millimeters to several centimeters can be manufactured. As a result, different housing geometries are possible, which can be manufactured with the same deep-drawing mild.

In addition, the result of a deep-drawn housing made of sheet metal is that the radii and distances of the openings can be designed to be substantially smaller compared with a housing made of cast iron, meaning that installation space can be saved. In addition, the housing made of sheet metal is less vulnerable to thermal stresses which occur to a greater extent in particular when connecting an exhaust gas heat exchanger, because the temperature gradient from the main flow channel to the connecting piece is relatively large due to the exhaust gas heat exchanger, since a relatively large quantity of heat is extracted from the housing by the exhaust gas heat exchanger.

The central axis, the bypass axis and the valve axis are each oriented substantially at right angles to one another, wherein the two sub-shells can be divided in a plane with one another, which is aligned parallel to the central axis and to the bypass axis.

The necessary collar for the valve can be manufactured as a passage. It is true that if a passage is provided, it is not possible to make the collar long, because the available material is limited according to the size of the passage. The fact that the collar can, however, be relatively small compared to the connecting piece, in order to support a valve shaft, means that a passage is completely sufficient.

In terms of more flexible manufacturing, it can also be advantageous if the two sub-shells, which are made up of individual sub-shells, are joined to one another.

In terms of simple manufacturing, it can also be advantageous if the entire connecting piece in one of the two sub-shells is deep-drawn. The subsequent joining of two individual sub-shells following the deep-drawing process makes it possible to adjust the two sub-shells relative to one another. Here as well, different geometries can be manufactured with the same melds. A short connecting piece is particularly advantageous for very small housing geometries.

In order to connect the individual sub-shells, it can be advantageous if the sub-shells lie in contact with one another or are butt-jointed by means of, in each case, an at least partially circumferential, added collar or are inserted into each other and welded or soldered to one another. The two sub-shells lie in contact with one another on the respective surfaces of the collars by means of the collar. In the case of butt-jointed sub-shells, the two sub-shells lie in contact with one another on the end face surfaces of the edge of the sheet metal, so that the contact surface is limited in its size by the material thickness of the sheet metal.

It can also be advantageous if at least one intermediate wall is arranged in the bypass opening, by means of which the bypass opening is divided into an intake opening and into a discharge opening, and is thus configured with a double flow. This results in a separation of the two exhaust gas streams, one of which flows into the heat exchanger and one of which flows out of the heat exchanger. Alternatively, a second bypass opening can be provided, so that the intake opening and the discharge opening are defined by the two bypass openings. The intermediate wall is integrated into the housing as a separate component.

It can be of particular importance to the present invention if the housing comprises two openings which are aligned in the direction of the valve axis, in which openings a valve shaft is rotatably arranged around a valve axis, wherein the opening for the valve bearing is configured as a passage and/or comprises a circumferential collar around the valve axis. The supporting of the valve shaft in one of the two sub-shells or between the two sub-shells makes it possible to adjust the design of the housing in virtually any way possible to the respective installation situation on the vehicle.

It can be advantageous for a better sealing of the main flow channel, if there is arranged on the valve flap a sealing element which is fixed to the valve shaft, projects from the valve shaft in a radial direction to the valve axis and which can be positioned in the direction of flow in front of the intermediate wall. This prevents leakages between the valve shaft and the intermediate wall.

In order to advantageously control the exhaust gas stream it is envisaged that the valve shaft be configured as a hollow shaft and be rotatably supported on a valve pin, wherein the valve pin is fixed to the housing. As a result, the valve flap having the sealing element can be more simply manufactured.

It is also advantageous that the valve flap is arranged centrally with respect to a midpoint of the valve flap or arranged offset eccentrically on the valve axis in a direction at right angles to the valve shaft. Depending on the support of the valve flap on the valve shaft, the bypass opening can be indirectly sealed with a valve flap which is substantially smaller than the bypass cross section.

It can additionally be advantageous if the valve flap is configured as profiled in a direction at right angles to the valve axis in such a way that at least one edge area forms a step that diverts a filament of flow of the exhaust gas stream received on the valve flap about an angle α between 5° and 45° in the direction of a central plane of the housing. The result of such a profile of the valve flap, which can also be configured in an undulatory form and in the form of an arc and which diverts the exhaust gas stream accordingly, is that it is possible to prevent the exhaust gas stream from partially flowing into the exhaust gas heat exchanger, even if the bypass opening is not fully closed.

It can be advantageous for a simple construction of the valve, if the valve flap can be brought to bear directly against the upper shell and directly against the lower shell. The installation of additional sealing elements or stops for the valve flap is avoided.

In connection with an eccentric support of the valve flap, it can also be advantageous if the valve axis is arranged on the housing in a radial direction to the valve axis offset from the central axis by a dimension which corresponds to at least 30% of the average diameter of the main flow channel. This particular configuration is described in more detail in the figures.

It can be advantageous in terms of the dimensioning and positioning of the valve flap if the ratio of the flow cross section to the bypass cross section comprises a dimension between 0.1 and 2.0 or between 0.85 and 1.15. It can be advantageous for deep-drawing and with respect to a relatively exact production tolerance if the dimension of the wall thickness of the housing prior to the deep-drawing deviates at least partially over and above the dimension of the manufacturing tolerance from the average wall thickness by between 30% and 200%.

The inlet opening and the outlet opening are configured so that they can be plugged onto an exhaust gas line or can be inserted into an exhaust gas line.

The use of a valve described above for positively connecting and/or connecting in a firmly bonded manner to an exhaust gas heat exchanger is advantageous, as is a method for manufacturing a housing described above, in which the main flow channel and the bypass opening are manufactured at the same time as one another by deep-drawing. The valve shaft having the valve flap is thereby inserted into the housing following the deep-drawing and positive connection of the housing.

A method in which only the intake opening or the first bypass opening in the direction of flow is sealed by the valve flap, in order to open the main flow channel completely and to the maximum extent, is also advantageous. The use of appropriate flow management prevents exhaust gas flowing into the discharge opening, without the discharge opening having to be sealed. This reduces the number of parts required and the outlay of adjusting an additional valve flap.

BRIEF DESCRIPTION OF THE DRAWINGS

Additional advantages and details of the invention are explained in the claims and in the description and are shown in the figures, wherein:

FIG. 1a shows a perspective view of a deep-drawn sheet metal shell having a half-passage respectively as a housing;

FIG. 1b shows the sheet metal shell according to FIG. 1a in a folded state;

FIG. 2a shows a perspective view of a deep-drawn sheet metal shell having two half-passages and an intermediate wall respectively;

FIG. 2b shows the sheet metal shell according to FIG. 2a in a folded state;

FIG. 3 shows a housing having a bypass opening and two passages for a valve shaft, formed from two sub-shells having an upper shell and a lower shell inserted into one another;

FIG. 6a shows a lateral view of a profiled valve flap having a step;

FIG. 6b shows the valve flap according to FIG. 6a in a view from above;

FIG. 7 shows a lateral view of an eccentrically supported valve flap;

FIG. 8 shows a lateral view of a less eccentrically supported valve flap;

FIG. 9 shows a lateral view of a centrally supported valve flap;

FIG. 10 shows a symmetrical valve flap;

FIG. 11 shows an unsymmetrical valve flap.

DETAILED DESCRIPTION OF THE INVENTION

Figure 4:
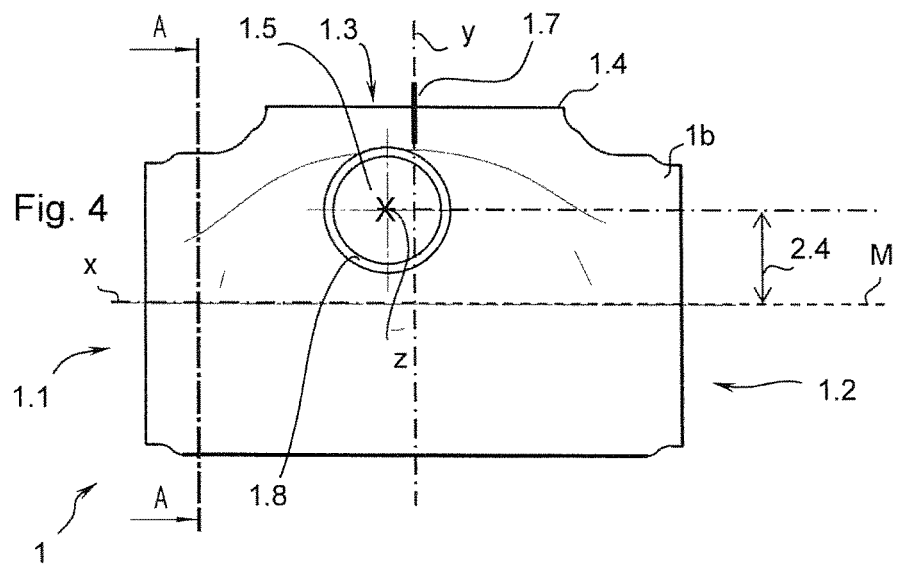
FIG. 4 shows a lateral view of an upper shell having a passage for a valve shaft.

FIG. 1a shows a perspective view of a deep-drawn sheet metal shell which is wound to form a housing 1 according to FIG. 1b. A sheet metal blank (not shown) which is cut to size according to the required dimensions for the housing 1 is deformed to form such a sheet metal shell by deep-drawing which is wound around the central axis X in a subsequent processing stage according to FIG. 1b, as a result of which a main flow channel 1.6 is formed which extends in the main direction of flow S from an inlet opening 1.1 to an outlet opening 1.2. To this end, the housing 1 comprises a first sub-shell 1a configured as an upper shell 1a and a second sub-shell 1b configured as a lower shell 1b. The separation of the two sub-shells 1a, 1b is shown by a line extending parallel to the central axis X. A bypass opening 1.3 is also formed at the same time as the main flow channel 1.6 by these two deep-drawn sub-shells 1a, 1b. The bypass opening 1.3 is, as shown in FIG. 1a, in each case half formed in the respective sub-shell 1a, 1b and is also bordered by a circumferential connecting piece 1.4. Both the bypass opening 1.3 and the connecting piece 1.4 are each half formed by the corresponding parts of the sheet metal shell, so that following the winding of the two sub-shells 1a, 1b in accordance with FIG. 1b both the main flow channel 1.6 and the connecting piece 1.4 close and complement one another to form a whole. Following the winding 1.3 an intermediate wall 1.7 is inserted into the bypass opening 1.3. The intermediate wall 1.7 divides the bypass opening 1.3 into an intake opening 1.3.1 and a discharge opening 1.3.2, as a result of which the bypass opening 1.3 has a double flow.

The main flow channel 1.6 extends in the direction of flow S in the direction of the central axis X. The bypass opening 1.3 is oriented in the direction of a bypass axis Y which is aligned at right angles to the central axis X. The plane of separation accordingly extends in the plane generated by the central axis X and the bypass axis Y. A valve shaft 2 which is described in greater detail in FIG. 5 et seq. swivels about a valve axis Z which extends at right angles to the central axis X and at right angles to the bypass axis Y.

According to FIGS. 2a and 2b, the housing 1 comprises two bypass openings 1.3, 1.3', the bypass axes Y of which extend in parallel adjacent to one another. The two bypass openings 1.3, 1.3' are separated from one another by the respective circumferential connecting pieces 1.4, 1.4' and a housing part, so that each individual bypass opening 1.3, 1.3' is enclosed in each case by a connecting piece 1.4, 1.4'. As a result the bypass system has a double flow. According to this embodiment example as well, the main flow channel 1.6 as well as the two bypass openings 1.3, 1.3', together with the two connecting pieces 1.4, 1.4', are formed by the respective sub-shell 1a, 1b and by the winding of the two sub-shells 1a, 1b to produce a whole.

The two sub-shells 1a, 1b in accordance with the embodiment examples according to FIGS. 1b and 2b are partially butt-jointed and partially lie in contact with one another by means of abutting surfaces 1.6.1. In one embodiment example which is not shown, the two sub-shells 1a, 1b exclusively lie in contact with one another in a butt-jointed manner. The edges of the sheet metal blank are not formed separately for the butt jointing. In the regions in which the two sub-shells 1a, 1b lie in contact with one another, they are firmly bonded with one another by welding or preferably by soldering or gluing.

In the alternative shown in FIG. 3 the two sub-shells 1a, 1b are inserted into one another and lie in contact adjacent to one another. In the regions in which the two sub-shells 1a, 1b lie in contact with one another or adjacent to one another, a gap is formed. The firm bonding simultaneously achieves a sealing of the housing 1. As an alternative to welding, the sub-shells 1a, 1b can also be connected to one another by soldering or gluing. In the process, the wound sub-shells 1a, 1b are only connected to one another on one side along the main flow channel 1.6 and along the connecting piece 1.4. In the case of joined sub-shells 1a, 1b a connection on the opposite side along the main flow channel 1.6 is additionally required. In the case of this embodiment example as well, an intermediate wall 1.7 is inserted into the connecting piece 1.4.

The housing 1 in accordance with FIG. 3 is shown in accordance with the section A-A according to FIG. 4 in a view in the direction of the valve axis Z. The respective sub-shell 1a, 1b was manufactured separately in contrast to the embodiment examples according to FIGS. 1a to 2b. In this housing 1 openings 1.5, 1.5' are provided in order to support a valve shaft 2 which is not shown, of which the openings are aligned in the direction of the valve axis Z. The two openings 1.5, 1.5' are each enclosed by a collar 1.8 which is also formed as a passage during the deep-drawing of the sub-shells 1a, 1b. The valve axis Z is arranged offset from the central plane M by the dimension 2.4 in a radial direction to the central axis X. This makes it possible to arrange the valve shaft 2, which is shown in greater detail in FIGS. 5 and 6, to the greatest possible extent outside the main flow channel 1.6.

The average diameter 1.9 of the main flow channel 1.6 between the inlet opening 1.1 and the outlet opening 1.2 is proportional to the average flow cross section SQ of the main flow channel 1.6. The same is true of the average bypass cross section BQ of the bypass opening 1.3, which is proportional to the average diameter of the bypass opening 1.3.

According to FIG. 3, the ratio of the average flow cross section SQ to the average bypass cross section BQ of the bypass opening 1.3 is a value of 1.15. In accordance with the embodiment example according to FIG. 4, the ratio of the average flow cross section SQ to the average bypass cross section BQ of the bypass opening 1.3 has a value of 0.85.

Figure 5:
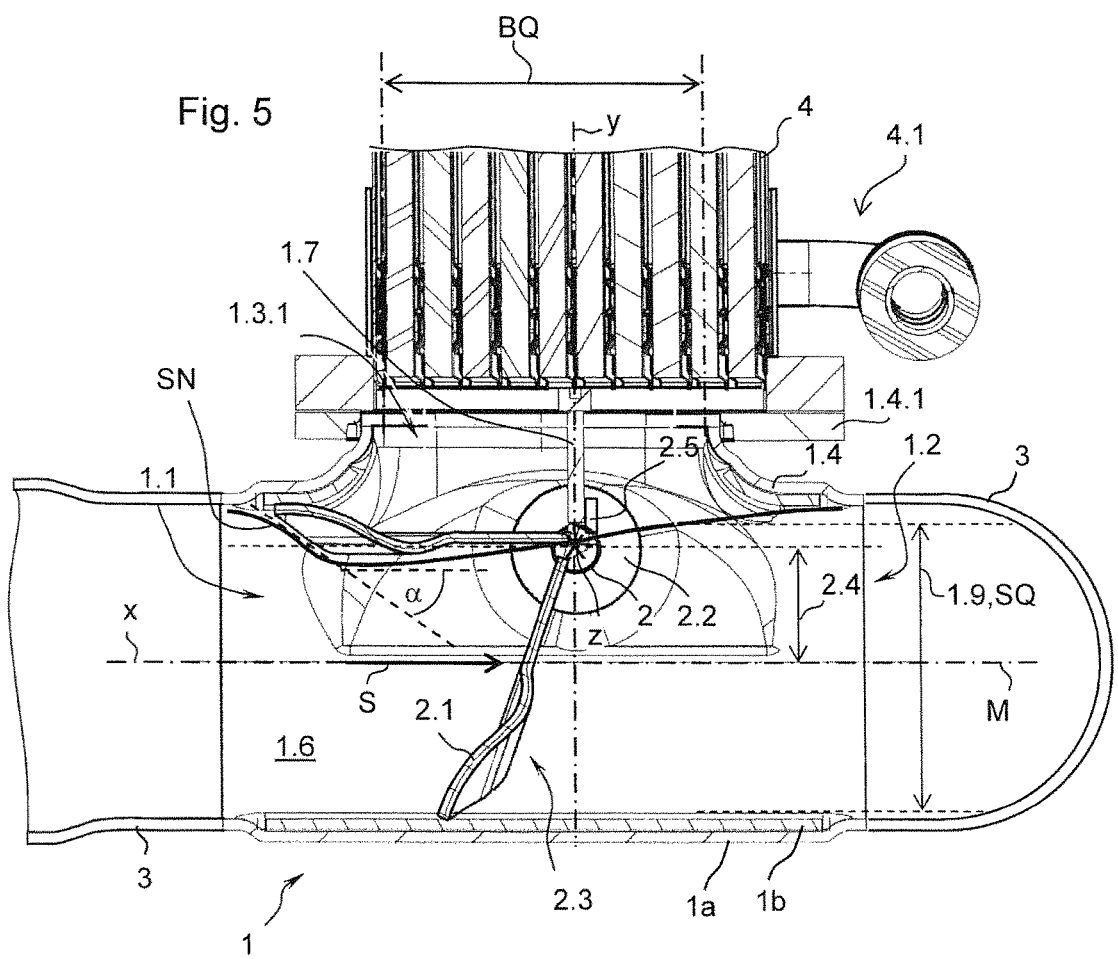
FIG. 5 shows a schematic diagram of a housing having a valve flap supported in the housing, which is shown in the open and the closed position, and an exhaust gas heat exchanger connected to the housing.

According to the FIG. 5 et seq. the valve flap 2.1 is fixed to the valve shaft 2 and is supported by means of a valve bearing 2.2, so that it can swivel around the valve axis Z in the main flow channel 1.6. The entire housing 1 is integrated into an exhaust gas line 3. The multi-piece exhaust gas line 3 is connected to both the inlet opening 1.1 and the outlet opening 1.2.

In the embodiment examples according to FIGS. 5 to 6b, the valve flap 2.1a comprises a step 2.3, by means of which the valve flap 2.1a forms an unwound wing end similar to a spoiler. A filament of flow SN moving in the direction of flow S and oriented to the inner wall of the housing 1 is diverted by the step 2.3 from a direction parallel to the central axis X or to the main direction of flow S about an angle α in the direction of the central plane M. The consequence of this is that after passing the valve flap 2.1 and the intake opening 1.3.1 the filament of flow SN does not continue to flow into the discharge opening 1.3.2, but within the flow cross section SQ in the direction of the discharge opening 1.2 in the housing 1. As a result of this position of the valve flap 2.1, which is substantially parallel to the central axis X, the exhaust gas stream is therefore prevented from flowing into the bypass opening 1.3. The part of the bypass opening 1.3, which forms the discharge opening 1.3.2, is thus indirectly closed against the inflow of exhaust gas due to the shaping of the valve flap 2.1. The dimension 2.4 of the diversion, which is achieved by the step 2.3 is such that no exhaust gas streams through the discharge opening 1.3.2 into the bypass opening 1.3 in certain flow conditions 1.3 and therefore no parasitic heat is generated in the subsequent exhaust gas heat exchanger 4.

In order to further seal the system, a sealing element 2.5 is provided on the valve flap 2.1, which is arranged with respect to the valve shaft 2 opposite the valve flap 2.1. In the position in which the valve flap 2.1 closes the main flow channel 1.6, the sealing element 2.5 prevents exhaust gas streaming through between the valve shaft 2 and the intermediate wall 1.7.

The exhaust gas heat exchanger 4 is connected to the housing 1 by means of a flange 1.4.1 provided on the connecting piece 1.4. As shown in FIG. 6, an exhaust gas heat exchanger 4 is connected to the housing 1 by means of the flange 1.4.1. A refrigerant circuit is connected by means of a supply line 4.1 to the exhaust gas heat exchanger 4. In an embodiment example which is not shown, the exhaust gas heat exchanger 4 with its outer housing jacket is inserted into the connecting piece 1.4 of the housing. To this end, it is particularly advantageous if the jacket housing of the exhaust gas heat exchanger 4 conducts exhaust gas and not a heat exchanger medium.

FIGS. 6a to 11 show various forms of valve flaps 2.1, which are either configured profiled, or flat in accordance with the embodiment examples according to FIGS. 7 to 11.

The embodiment examples in accordance with FIGS. 6a, 6b, 7 and 11 clearly show the principle of operation of the sealing element 2.5, which prevents the passage of exhaust gas between the valve shaft 2 and the intermediate wall 1.7 in the direction of flow S along the central axis X.

Regardless of the profile the valve flaps 2.1 are supported cantered on the valve shaft 2 according to FIGS. 9 and 10, i.e. a midpoint of the respective valve flap 2.1 is aligned in a direction at right angles to the valve flap 2.1 with the valve axis Z. In the case of this embodiment example no sealing element 2.5 is provided.

The valve flap 2.1 according to FIG. 8 is arranged offset in a direction at right angles to the valve axis Z and is therefore arranged eccentrically on the valve shaft 2. This embodiment, which is shown with a double arrow, is preferably intended to be arranged offset from the central axis X inside the housing 1. No sealing element 2.5 is provided in this embodiment example either.

What is claimed is:

1. A housing for fluidically connecting an exhaust gas line to an exhaust gas heat exchanger comprising,
    a) a main flow channel of the housing that extends in a direction of a central axis (X) from an inlet opening to an outlet opening, with a flow cross section (SQ);
    b) in the housing there is provided at least one opening which is arranged coaxially to a valve axis (Z) for a valve shaft,
    c) on the housing there is provided at least one bypass opening, formed by a connecting piece with a bypass cross section (BQ) for connecting an exhaust gas heat exchanger between the inlet opening and the outlet opening, wherein the connecting piece is formed circumferentially around a bypass axis (Y),
    d) the housing is formed by a maximum of two deep-drawn sub-shells made of sheet metal, executed as an upper shell and a lower shell, which respectively form one of two parts of a main flow channel which complement one another to form a whole, said main flow channel extending in the main direction of flow (S) from the inlet opening to the outlet opening,
    e) the two sub-shells made up of a one-piece, deep-drawn sheet metal part form a single-piece housing,
    f) there is arranged in the bypass opening at least one intermediate wall, by which the bypass opening is divided into an intake opening and into a discharge opening, and is thus configured with a double flow, wherein the housing comprises two openings which are aligned in the direction of the valve axis (Z), in which the valve shaft is rotatably arranged around the valve axis (Z), wherein the opening for a valve bearing is configured as a passage or as a bore and/or comprises a circumferential collar around the valve axis (Z), wherein a valve flap is arranged on the valve shaft.

2. The housing according to claim 1, wherein the connecting piece, made up partially of the upper shell and partially of the lower shell, complementarily form(s) an entire circumferential connecting piece around the bypass axis.

3. The housing according to claim 1, wherein the entire connecting piece in one of the two sub-shells is deep-drawn.

4. The valve according to claim 1, wherein there is arranged on the valve flap a sealing element which is fixed to the valve shaft, projects from the valve shaft in a radial direction to the valve axis (Z) and which can be positioned in the direction of flow (S) in front of the intermediate wall.

5. The valve according to claim 1, wherein the valve shaft is configured as a hollow shaft and is rotatably supported on a valve pin, wherein the valve pin is fixed to the housing.

6. The valve according to claim 1, wherein the valve flap is configured profiled in a direction at right angles to the valve axis (Z) in such a way that at least one edge area forms a step which diverts a filament of flow (SN) of the exhaust gas stream received on the valve flap about an angle ($\alpha$) between 5° and 45° in the direction of a central plane (M) of the housing.

7. The valve according to claim 1, wherein the valve flap can be brought to bear directly against the upper shell and directly against the lower shell.

8. The valve according to claim 1, wherein the valve axis (Z) is arranged on the housing in a radial direction to the valve axis (Z) offset from the central axis (X) by a dimension which corresponds to at least 30% of the average diameter of the main flow channel.

9. A method according to claim 1 including the step of: firmly bonding the valve for positively connection and/or connection to an exhaust gas heat exchanger.

10. A method for manufacturing a housing according to claim 1 including the step of manufacturing the main flow channel and the bypass opening at the same time as one another by deep-drawing.

11. A method for operating a valve according to claim 1 including the step of: in which, in order to open the main flow channel completely and to the maximum extent, only the intake opening or the first bypass opening in the direction of flow (S) is sealed by means of the valve flap.

12. A system consisting of a valve according to claim 1 and at least one exhaust gas heat exchanger as well as at least one exhaust pipe for an exhaust gas system for an internal combustion engine.

13. The housing according to claim 2, wherein the entire connecting piece in one of the two sub-shells is deep-drawn.

14. The valve according to claim 13, wherein there is arranged on the valve flap a sealing element which is fixed to the valve shaft, projects from the valve shaft in a radial direction to the valve axis (Z) and which can be positioned in the direction of flow (S) in front of the intermediate wall, and wherein the valve shaft is configured as a hollow shaft and is rotatably supported on a valve pin, wherein the valve pin is fixed to the housing.

15. The valve according to claim 14, wherein the valve flap is configured profiled in a direction at right angles to the valve axis (Z) in such a way that at least one edge area forms a step which diverts a filament of flow (SN) of the exhaust gas stream received on the valve flap about an angle ($\alpha$) between 5° and 45° in the direction of a central plane (M)

of the housing, and wherein the valve flap can be brought to bear directly against the upper shell and directly against the lower shell.

16. The valve according to claim 15, the valve axis (Z) is arranged on the housing in a radial direction to the valve axis (Z) offset from the central axis (X) by a dimension which corresponds to at least 30% of the average diameter of the main flow channel.

* * * * *